United States Patent
Ghera et al.

(10) Patent No.: US 6,433,922 B1
(45) Date of Patent: Aug. 13, 2002

(54) APPARATUS AND METHOD FOR A SELF ADJUSTING RAMAN AMPLIFIER

(75) Inventors: Uri Ghera, Tel Aviv; Doron Meshulach, Ramat Gan; Ophir Eyal, Ramat Hasharon, all of (IL)

(73) Assignee: REDC Optical Networks Ltd., Tel Aviv (IL)

( * ) Notice: Subject to any disclaimer, the term of this patent is extended or adjusted under 35 U.S.C. 154(b) by 0 days.

(21) Appl. No.: 09/791,685

(22) Filed: Feb. 26, 2001

(51) Int. Cl.$^7$ .................................................. H01S 3/00
(52) U.S. Cl. ........................................ 359/334; 359/337
(58) Field of Search ................................. 359/334, 337, 359/341.4

(56) References Cited

U.S. PATENT DOCUMENTS

| | | |
|---|---|---|
| 4,401,364 A | 8/1983 | Mochizuki |
| 4,616,898 A | 10/1986 | Hicks |
| 4,699,452 A | 10/1987 | Mollenauer |
| 5,298,965 A | 3/1994 | Spirit et al. |
| 5,448,059 A | 9/1995 | Blank et al. |
| 5,623,508 A | 4/1997 | Grubb et al. |
| 5,673,280 A | 9/1997 | Grubb et al. |
| 5,966,206 A | 10/1999 | Jander |
| 6,038,356 A | 3/2000 | Kerfoot et al. |
| 6,052,219 A | 4/2000 | Kidorf et al. |
| 6,081,366 A | 6/2000 | Kidorf |
| 6,181,464 B1 | 1/2001 | Kidorf et al. |
| 6,292,288 B1 * | 9/2001 | Akasaka et al. ............ 359/334 |

FOREIGN PATENT DOCUMENTS

JP    WO00/05622    7/1999

OTHER PUBLICATIONS

"Optical Time Domain Reflectometry on Optical Amplfier Systems", Blank et al, Journal of Lightwave Technology vol. 7, No. Oct. 1989 pp. 1549–1555.

"Raman–Assisted Long Distance Optical Time Domain Reflectometry" Electronics Letters, Dec. 89 vol. 25 No. 25 p. 1687–9 Spirit et al.

(List continued on next page.)

Primary Examiner—Mark Hellner
(74) Attorney, Agent, or Firm—Mark M. Friedman

(57) ABSTRACT

This invention describes an apparatus and method for a self adjusting Raman amplifier for fiber optic transmission lines incorporating a line diagnostic mechanism in order to calculate, control and optimize the operating parameters for the amplifier. This need arises because the amplifier gain medium is the transmission line itself and the amplifier properties depend on the optical fiber properties along the first tens of kilometers of the transmission line from the pump. A Line Analyzing Unit, adjacent to the Raman pump unit, operates before the Raman pump is enabled and during operation, and characterizes the transmission line. The Line Analyzing Unit determines and characterizes the types of optical fibers installed along the transmission line and calculates and optimizes the pump or pumps power in order to achieve optimum gain and gain equalization. The Line Analyzing Unit may also determine if there is an optical loss or reflection in the optical fiber that can be destructive when the high power Raman pump is operating.

27 Claims, 5 Drawing Sheets

OTHER PUBLICATIONS

"OTDR performance enhancement through erbium fibre amplification" Electronics Letters, Dec. 89 vol. 25 No. 25 p. 1693–4 Spirit et al.

G P Agrawal; "Nonlinear fiber optics" pp. 316–369 Academic press, $2^{nd}$ Edition,1995.

R G Smith "Optical power handling capacit of low loss optical fibers as determined by Stimulated Raman and Brillouin scattering" Applied Optics vol. 11, No. 11, p. 2489 1972.

R T Stolen, "Raman Gain in glass optical waveguides" Applied Physics Letters, vol. 22 No. 6, p. 276, 1973.

J Auyeung et al "Spontaneous and stimulated Raman scattering in long low loss fibers" Journal or Quantum Electronics vol. QE–14 No. 5, p. 347, 1978.

"Erbium–Doped Fiber Amplifiers—Fundamentals and Technology" by P.C. Becker et al, pp. 346–351, Academic Press 1999.

"Fiberoptic test and measurement" by D. Derickson Prentice Hall Inc. New Jersey 1998.

T. Terahara et al. "128×10.66 Gbts/s transmission over 840–km standard SMF with 140–km optical repeater spacing (30.4–dB loss) employing dual–band distributed Raman amplification", ppr PD28 Optical Fiber Communication Conference 2000, Baltimore, MD, USA Mar. 7–10, 2000.

C. Fludger et al. "An analysis of the improvements in OSNR from distributed Raman amplifiers using modern transmission fibres" FF2–1 Optical Fiber Communication Conference 2000, Baltimore, MD, USA Mar. 7–10, 2000.

* cited by examiner

APPARATUS AND METHOD FOR A SELF ADJUSTING RAMAN AMPLIFIER

BACKGROUND OF THE INVENTION

1. Field of the Invention

The present invention relates generally to optical amplifiers used in fiber optics for telecommunications. More particularly, the invention relates to a Raman optical fiber amplifier and method and apparatus for enabling dynamic self adjusting gain optimization and equalizing amplified optical output.

2. Background Art

In optical fiber communication systems, communication channels can be provided by transmitting signals impressed on laser beams having different wavelengths (WDM). Although optical fiber communication systems utilizing wavelength-distinct modulated channels may carry information over long distances, signals transmitted through optical fibers are attenuated mainly by the cumulative and combined effects of absorption and scattering. While the signal attenuation per kilometer in optical fibers used for communications is typically low, signals transmitted over increasing transmission distances require periodic amplification over long distances. Amplification in fiber optic communication systems is performed mainly by electronic repeaters, Erbium doped fiber amplifiers (EDFA's), semiconductor optical amplifiers, waveguide amplifiers and Raman amplifiers.

While amplification using electronic repeaters involves optical to electrical to optical conversions, amplification using EDFA's, semiconductor optical amplifiers, waveguide amplifiers and Raman amplifiers is performed directly on optical signals, involving no optical to electrical to optical conversions. The Raman amplification process significantly differs from other amplification methods mentioned, as the transmission line itself can serve as the gain medium, whereas a module or component dedicated for the amplification process is used in other amplification methods. The Raman amplification process is based on the Raman effect, which describes conversion or scattering of a fraction of the optical power from an incident optical beam having a higher optical frequency to an optical beam having a lower optical frequency. The optical frequency shift between the incident beam and the scattered beam is determined by the vibrational states of the medium through which both beams are propagating. The Raman effect in silica-based fibers is described by quantum mechanics as scattering of an incident photon by a molecule to a photon with a lower optical frequency, while the molecule makes a transition between two vibrational states of the medium. Raman amplification involves Stimulated Raman scattering, where the incident beam, having the higher optical frequency, often referred to as the pump beam, is used to amplify the lower optical frequency beam, often referred to as the Stokes beam or the signal beam, through the Raman effect. The pump beam pumps the molecules of medium to an excited vibrational state, while the photons of the signal beam propagating through the excited molecules stimulate the emission of photons at the signal frequency, thereby amplifying the signal while the excited molecules return to their lower vibrational states [See for example "Nonlinear fiber optics" by G. P. Agrawal, pp. 316–369, Academic Press, 2nd edition, 1995]. Stimulated Raman scattering may involve a multiplicity of pumps at different frequencies and a multiplicity of signals at different frequencies. A Raman amplifier, which is based on the Stimulated Raman scattering effect, may amplify a single optical channel, as well as collectively amplify a series of optical signals, each carried on a wavelength corresponding to a distinct channel. A Raman amplifier with a single pump source, where a fiber optic is used as the gain medium can amplify signals extending over a wide frequency range, referred to as the Raman gain spectrum or the Raman gain band. The Raman gain spectrum in silica optical fibers extends over a wide frequency range, with a broad peak downshifted by about 13 THz from the pump frequency. The Raman gain spectrum in optical fibers is not associated with fixed energy levels of the gain medium, as with rare earth element dopants in glass based fibers such as Erbium. Consequently, Raman amplification can be achieved practically at any wavelength in the near infra-red spectrum, as long as the appropriate pumping light source is available. This advantage allows Raman amplification to be applied for optical communications across the entire optical communication transmission window of silica optical fibers.

Raman amplification in optical fibers was thoroughly investigated in the seventies [R. G. Smith, "Optical power handling capacity of low loss optical fibers as determined by Stimulated Raman and Brillouin scattering", Applied Optics, Vol. 11 No. 11, p. 2489, 1972, R.H. Stolen et al., "Raman gain in glass optical waveguides", Applied Physics Letters, Vol. 22 No.6, p. 276, 1973, and J. Auyeung et al., "Spontaneous and stimulated Raman scattering in long low loss fibers", Journal of Quantum Electronics, Vol. QE-14 No. 5, p. 347, 1978]. By the early eighties, the use of Raman amplifiers in optical communication systems had been proposed for multi-wavelength transmission [Mochizuki et al., "Optical repeater system for optical communication", U.S. Pat. No. 4,401,364; Hicks, Jr. et al., "Optical communication system using Raman repeaters and components therefor", U.S. Pat. No. 4,616,898; and Mollenauer et al., "Optical communications system comprising Raman amplification means", U.S. Pat. No. 4,699,452]. However, reliable commercial and affordable high power means for Raman pumping of single mode fibers did not exist in the 1980s, and Raman amplification was usually considered for highly special uses such as Soliton transmission [Mollenauer et al., "Optical communications system comprising Raman amplification means", U.S. Pat. No. 4,699,452].

In the late 90's, as high power EDFA's became common, reliable high power pump laser diodes at the 1480 nm wavelength range were commercially available. As this wavelength range is also suitable for pumping of silica fibers Raman amplifiers [See for example "Erbium-Doped Fiber Amplifiers—Fundamentals and Technology", by P. C. Becker et al., pp. 346–351, Academic Press, 1999], Raman amplifiers received renewed attention [Grubb et al., "Article comprising a counter-pumped optical fiber Raman amplifier", U.S. Pat. No. 5,623,508; Grubb et al., "Article comprising low noise optical fiber Raman amplifier", U.S. Pat. No. 5,673,280; Kerfoot et al., "Lightwave transmission system employing Raman and rare-earth doped fiber amplification", U.S. Pat. No. 6,038,356; Kidorf et al., "Wide bandwidth Raman amplifier capable of employing pump energy spectrally overlapping the signal", U.S. Pat. No. 6,052,219; Kidorf et al., "Optical fiber communication system with a distributed Raman amplifier and a remotely pumped Er-doped fiber amplifier", U.S. Pat. No. 6,081,366; Y. Akasaka et al., "Raman amplifier optical repeater and Raman amplification method", WO005622A1; T. Terahara et al., "128×10 Gbits/s transmission over 840-km standard SMF with 140-km optical repeater spacing (30.4-dB loss) employing dual-band distributed Raman amplification", paper PD28 Optical Fiber Communication Conference 2000, Baltimore, Md., USA, March 7–10, 2000]. Although Raman amplifiers are generally more complex and costly than EDFA's, they allow amplification of a wide optical spectrum, with typically lower optical noise and over longer distances.

In contrast to EDFAs, where amplification properties are dependent only on the EDFA module, the transmission line itself can be used as the gain medium of a Raman amplifier, and thus, amplification properties such as gain and gain equalization are closely related to the type, properties and characteristics of the fiber used and the fiber condition (e.g. the distribution of losses along the fiber, the fiber effective area, Raman gain coefficient of the fiber and fiber length) [C. Fludger et. al., "An analysis of the improvements in OSNR from distributed Raman amplifiers using modern transmission fibres", paper FF-2 Optical Fiber Communication Conference 2000, Baltimore, Md., USA, Mar. 7–10, 2000.].Thus it is impossible to accurately predict the performance of the Raman amplifier, including gain, gain equalization and noise properties, without a thorough knowledge of the fiber types properties, characteristics and conditions along the fiber optic transmission line. Moreover, the condition of the transmission line can have another critical influence on Raman amplifier performance. If the physical contact between two connectors joining two segments of the line is inadequate (such as air gaps between connectors), an electric arc at that point can be caused by the high optical power density associated with the Raman pumping. Such an electric arc may cause high losses at the point where it occurs, and can render the whole transmission line unusable [Jander et al., "Interlocked high power fiber system using OTDR", U.S. Pat. No. 5,966,206].

As result of the dependence of Raman amplifier performance on the optical fiber characteristics (along the first tens of kilometers from the pump source) there is a need for a Raman amplifier that incorporates a transmission line diagnostic mechanism in order to calculate, adjust and optimize in-situ the operating parameters of the amplifier. Because the transmission line characteristics, as well as the transmitted signals power can change in time (e.g. fiber degradation due to aging and maintenance), this mechanism has to be able to continue performing tests on the optical fiber transmission line during the operation of the Raman amplifier.

There is also a need for this diagnostic mechanism to be able to prevent initiation or continuation of Raman amplification, for example, when launching high power pump into the transmission line can render the whole transmission line unusable.

SUMMARY OF THE INVENTION

This invention describes an apparatus and method for a Raman amplifier for fiber optic transmission lines incorporating a line diagnostic mechanism in order to test and characterize the line, calculate, control and optimize the operating parameters of the amplifier. This need arises because the amplifier gain medium is the transmission line itself and the amplifier properties depend on the optical fiber properties along the first tens of kilometers from the pump source of the transmission line.

According to the present invention there is provided a method of operating an optical fiber transmission line wherethrough signals are transmitted in a signal wavelength band, including the steps of: (a) pumping the transmission line, using at least one optical pump, thereby effecting Raman amplification of the signals; (b) determining at least one characteristic of the optical fiber transmission line; and (c) adjusting a power of the at least one optical pump in accordance with the at least one characteristic.

According to the present invention there is provided an amplifier for an optical fiber transmission line, including: (a) at least one optical pump for pumping the transmission line to amplify signals that are transmitted therethrough by Raman amplification; (b) at least one monitoring system for determining at least one characteristic of the transmission line; and (c) a line analyzing unit for adjusting a power of the at least one optical pump in accordance with the at least one characteristic.

According to the present invention there is provided a method of operating an optical fiber transmission line wherethrough signals are transmitted, including the steps of: (a) pumping the transmission line, using at least one optical pump, thereby effecting Raman amplification of the signals; (b) measuring a power of the signals; and (c) adjusting a power of the at least one optical pump in accordance with the power of the signals.

According to the present invention there is provided an amplifier for an optical fiber transmission line, including: (a) at least one optical pump for pumping the transmission line to amplify signals that are transmitted therethrough by Raman amplification; (b) a monitoring system for measuring a power of the signals; and (c) a line analyzing unit for adjusting a power of the at least one optical pump in accordance with the measured power of the signals.

A Raman optical fiber amplifier for communications is composed of a single or several high power light sources, typically high power laser diodes that act as optical pumps, typically at wavelengths between 1400 and 1500 nm. The amplification is performed along the optical fiber transmission line itself by non-linear Raman processes. A line analyzing unit, adjacent to the Raman pump unit, determines the types of optical fibers installed along the transmission line. the optical gain and loss distribution along them and other properties. The line analyzing unit may also determine if there exists optical loss that can be destructive when the high power Raman pump light is traversing through the line.

Data received after performing the tests allows the line analyzing unit to perform calculations required for optimization of the gain and gain equalization for the Raman amplifier and to enable or disable the Raman pump or pumps. This information can be delivered either to the amplification management unit or stored in the unit performing the Raman pumping. These tests can be performed continuously during the course of Raman pumping and can be used to change operational status when changes along the transmission line occur.

The invention described herein significantly improves upon the prior art by providing an optical fiber transmission line diagnostic mechanism in order to calculate, adjust and optimize in-situ the operating parameters such as the optical power of the pump source or sources of the Raman amplifier. This diagnostic mechanism can also initiate shut-down of the high power pumps, and also prevent initiation of Raman amplification when breaks or cracks are present in the transmission line that would prove destructive. The invention has the capability to continuously monitor the optical fiber transmission line by performing tests during the operation of the Raman amplifier.

DETAILED DESCRIPTION OF THE INVENTION

Figure 1A:
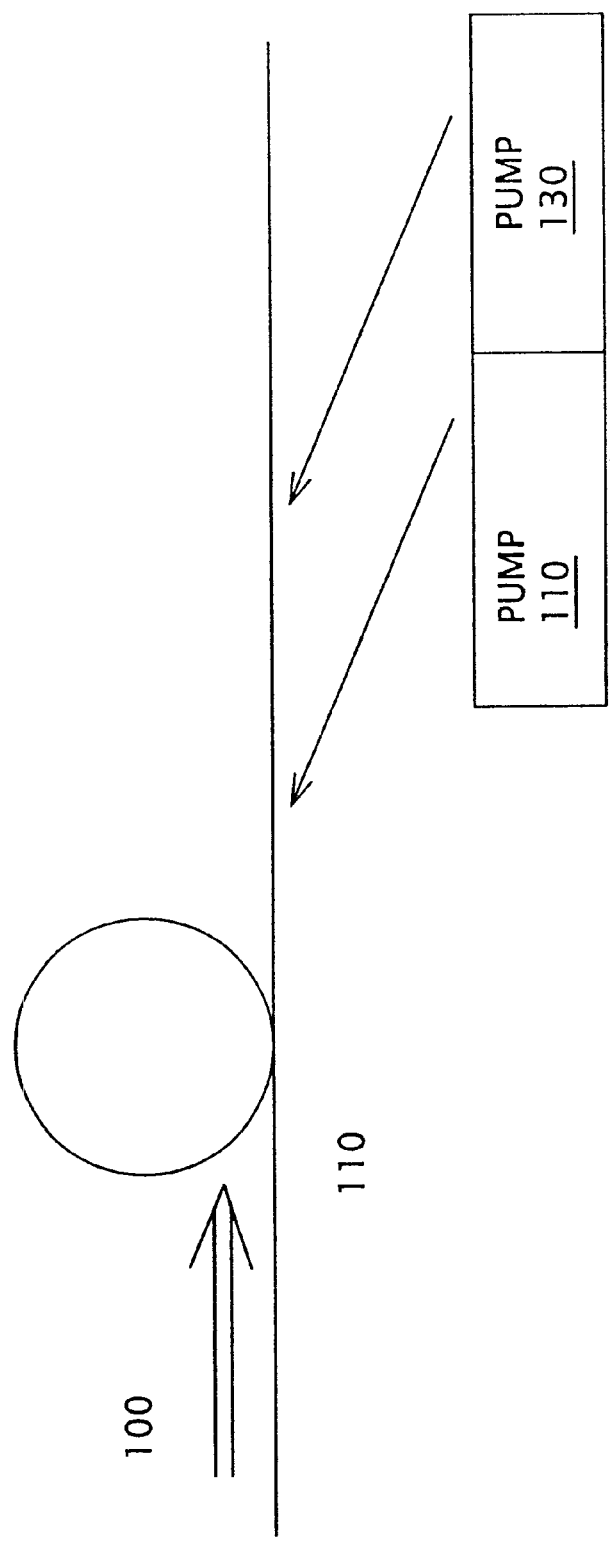
FIG. 1a: Raman amplification along an optical fiber serving as the transmission line, showing the relationship of the unit performing Raman pumping with the Line Analyzing Unit.

This invention describes a method of Self Adjusting Raman Amplifier. The Self Adjusting Raman Amplifier is comprised of a Raman Pump (RA) and a line analyzing unit (LAU). The RA amplifies the optical data signals as they propagate along the optical fiber. The LAU analyzes and monitors the optical fiber and accordingly, controls and optimizes the performance of the RA. During the initialization of the RA, the LAU is used to analyze the optical fiber, and set RA parameters accordingly to obtain optimal performance of the RA. Optimal performance of the RA includes optimal gain and gain equalization. During operation, the LAU is used to monitor the transmission line, and dynamically change the parameters of the RA as a response to changes in the transmission line. For example, if signals are routed through a fiber with different characteristics, the LAU will vary the Raman pump power, and update the operator. If the fiber is cut or a connector is open, the LAU will identify such a situation, and prevent the RA from operating and update the operator accordingly.

Optimal performance of the RA should take into account the following parameters of the optical transmission line:

1. Fiber sections, types and lengths and their related Raman gain coefficient and effective area.
2. Quality of connectors and splices along the fiber, maximal allowed launched power and Eye-safety related issues.
3. Optical propagation losses at signal and pump wavelengths.

The following techniques are used in the described invention to characterize these line properties:

1. Fiber Sections, Types and Lengths and their Related Raman Gain Coefficient and Effective Area.

a) Measuring the Raman on-off gain (on-off gain is the gain obtained as the ratio of the measured signal with and without a pump) for a signal that is within the gain spectrum of the pumps, but outside of the spectral range of the data. From the on-off gain of such a probe signal, the ratio of the Raman gain coefficient to the effective area can be calculated, from which the fiber type can be identified. This ratio is used for calculating the gain and the expected performance of the RA. The signal used to measure the on-off gain can be either a pulsed signal or a continuous wave signal. In the case of a pulsed signal, synchronized with the light source, distribution of Raman gain along the fiber can be measured by time gating the Rayleigh backscattered radiation from different sections of the fiber. In Rayleigh scattering, as discussed earlier, part of the pulse energy is reflected according to [See for example "Fiber optic test an measurements", edited by D. Derickson, Prentice Hall PTR 1998]:

$$dp = k\, P(z)\, dz \quad (1)$$

where dp is the scattered power at position z, dz is an infinitesimal small fiber interval, P(z) is the power at point z, and k is given by $$k = \alpha (NA/n)^2 / m \quad (2)$$

where NA is the fiber numerical aperture, n is the refractive index of the fiber core, m depends on the refractive index profile of the fiber and a is the scattering coefficient, which is inversely proportional to the fourth power of the wavelength. By measuring the backscattered radiation within the Raman gain band but outside of the signal data band, and by calculating the anticipated gain shape (pump lasers wavelengths and powers used are known to the LAU), the Raman gain at the signal band can be calculated. The performance of the Raman amplification of the given transmission line can be calculated by:

a) Measuring the gain of at least one probe signal at least at one wavelength (the wavelength used to measure the on-off gain).

b) Same as (a) but using two or more pump power levels. Comparing the on-off Raman gain at the different pump power levels, with known such values for different fiber types, stored in the LAU, identifies more accurately the fiber type. By analyzing the data on fiber type, it is possible to calculate the gain of the transmission link ["An analysis of the improvements in OSNR from distributed Raman Amplifiers using modern transmission fibres" by C.Fludger et. Al., Transactions of OFC2000 paper FF2, Baltimore, February 2000].

c) Measuring the backscattered Stimulated Raman scattering (SIRS) of a pump, at one or more pump power levels. The ratio of the backscattered Stimulated Raman scattering measured at two pump power levels indicates the fiber type. From these measurements, the fiber type is identified by comparing the measured data with known such values for different fiber types (as in (b)), stored in the LAU.

d) Measuring the fiber dispersion (with pulses at two or more wavelength or any other method) and comparing the dispersion data to known data of different fiber types stored in the LAU. This method is based on the fact that standard commercial fibers used for communications are characterized by distinct dispersion curves.

e) Using data signal wavelength monitor at the location of the Raman pump unit and adjusting the pump levels to achieve optimal gain and gain equalization.

2. Quality of Connectors and Splices Along the Fiber, Maximal Allowed Launched Power and Eye-safety Related Issues.

The Raman amplification process in optical fibers requires a high power light source, usually a laser (or a multiplicity of lasers) with typical power of 0.2–2 Watts to pump molecules of the transmission line medium into excited vibrational modes or states for subsequent deexcitation by stimulated emission. Such high energy levels can inflict damage on infrastructure where two fibers are connected (connectors, fusion splice, mechanical splice etc.) and can inflict bodily damage if radiation is directed to the eye. In order to avoid physical damage to body or infrastructure, a mechanism that disables the pump power in case of a faulty fiber or cutting or opening of a connector, has to be incorporated into the LAU.

The mechanism can be based on one of the following measurements or on any combination of them:

a) A possible indication of an open connector is a strong backreflection of the pump power resulting from Fresnel reflection. In Fresnel reflection, part of the light is reflected due to the discontinuity in the index of refraction at any interface according to:

$$R=(n1-n2)^2/(n1+n2)^2 \qquad (3)$$

Where n1 and n2 are the indices of refraction at the interface discontinuity R is the reflectance, and the reflecting plane is assumed to be perpendicular to the fiber axis. Thus, when a connector is opened a discontinuity in the index of reflection may occur, and a peak in the reflected light, may be detected in some cases, with a coupler or a circulator and an adequate WDM filter. Once such a strong back reflection has been detected, the pump unit is disabled. Then, it is possible to find the location of the open connector or the location of the cut, by sending a pulse, and the distance is obtained by measuring the travel time of the pulse to propagate to the connector and back, in an OTDR-like method [see for example—"Fiberoptic test and measurement", by D. Derickson, Prentice Hall inc., New Jersey, 1998].

b) In case of a break of the transmission line, the fault can be detected by power loss of the input data signals as sampled by an optical coupler of the LAU.

3. Optical Propagation Losses at Signal and Pump Wavelengths

Optical propagation losses at signal and pump wavelengths can be measured using an OTDR-like method [see for example—"Fiberoptic test and measurement", by D. Derickson, Prentice Hall inc., New Jersey, 1998]. The unit will be able to send a warning signal to the system management if it detects that pump power is not delivered to the line (tap on the line exiting the LAU) or if there are significant losses of the fiber transmission line (especially close to pump unit) which will render most of the pump energy unusable and thus the whole Raman amplifier as inefficient.

A self adjusting Raman optical fiber amplifier for communications is composed of a single or several high power light sources, typically laser diodes, that act as optical pumps at wavelengths typically between 1400 and 1500 nm and is shown in FIG. 1a in a typical mode of operation. The amplification of signal 100 is performed along the optical fiber transmission line 110 by non-linear Raman processes with a high power Raman pump 120 (Pump 120 could also be placed at the beginning of the line, where pump and data propagate at the same direction, often referred to as forward pumping). A Line Analyzing Unit 130, adjacent to the Raman pump unit, is operated before Raman pump 120 is enabled and characterizes the transmission line. Line Analyzing Unit 130 determines if there is an optical loss in the fiber that can be dangerous to human beings or destructive to the optical fiber when the high power beam traverses this point. Such optical losses are typically caused by cracks, breaks, unclosed connectors etc. Line Analyzing Unit 130 also determines the amplification characteristics and properties of optical fiber installed along transmission line 110. The different techniques used to perform those measurements are described in figure 1b. LAU 130 receives data from a several monitoring systems which include: Optical spectrum analyzer unit 140, backscattered light from continuous wave source and/or from repetitive pulsed source, optionally time gated at the receiver, in the Raman gain band 150, backscattered light from continuous wave source and/or from repetitive pulsed source, optionally time gated at the receiver, outside of the Raman gain band 160, back reflected light at pump wavelengths 170, input tap and detector for monitoring the power of light 180, and dispersion measurement of the fiber 190.

Figure 1B:
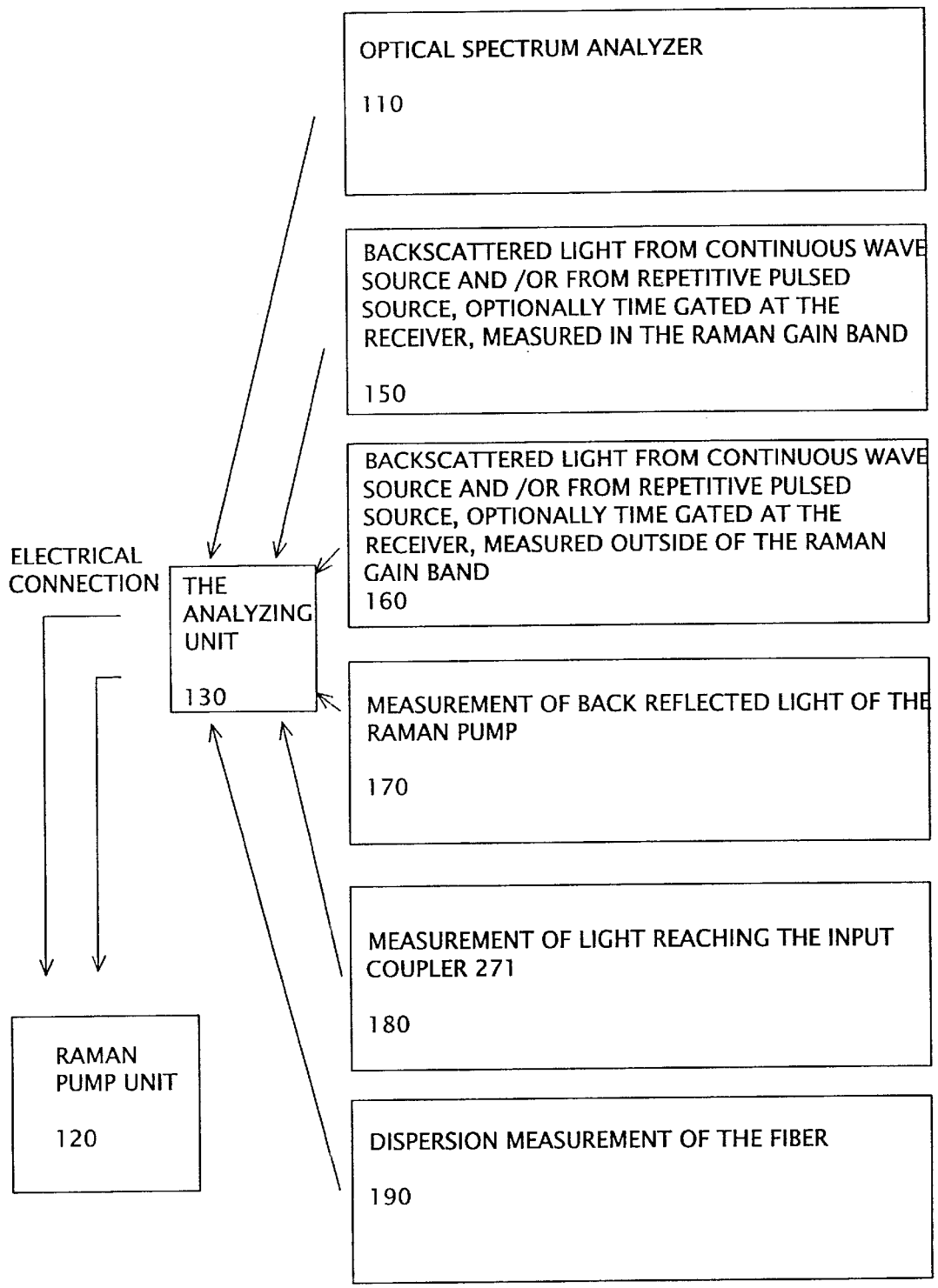
FIG. 1b: Data received by the Line Analyzing Unit.
Figure 1C:
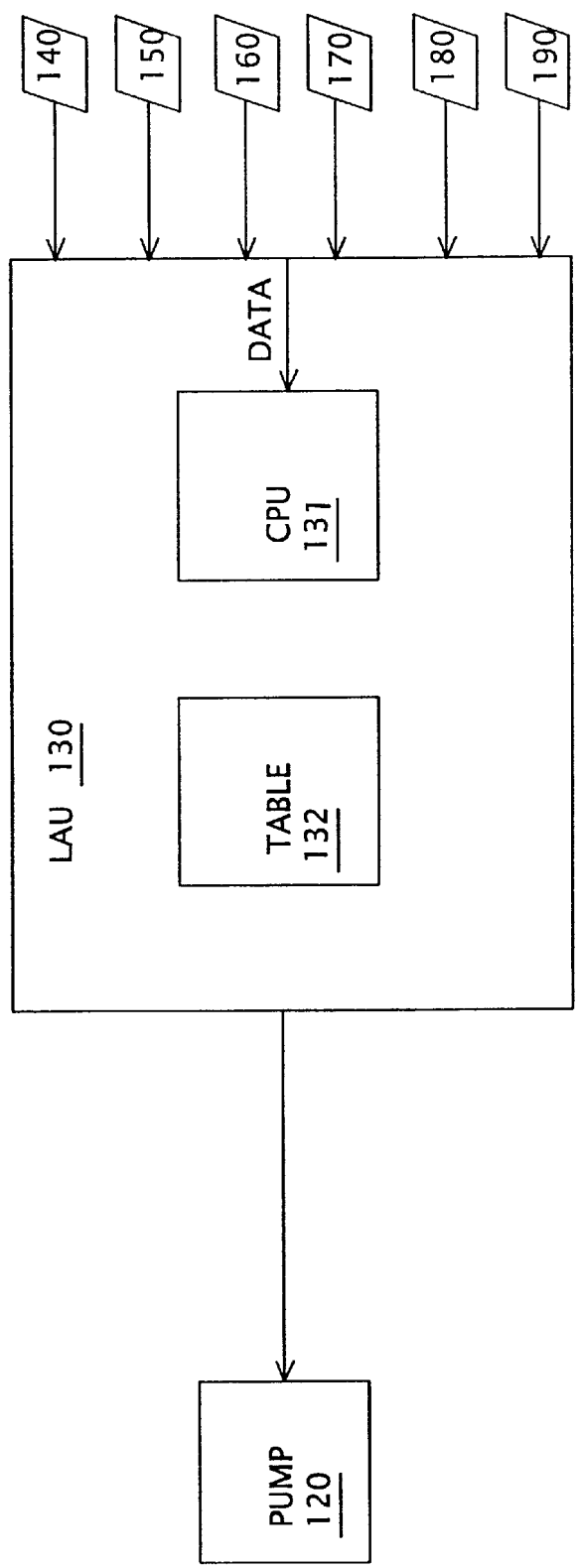
FIG. 1c: Data processing of the Line Analyzing Unit

As seen in FIG 1c, data from all devices or some of them is converted from analog to digital signals and fed into a microprocessor with a central processing unit (CPU) 131. CPU 131 compares the data received with stored data in Table 132 and sends commands to Raman pump 120 to set the currents of Raman pumps 120 in order to achieve optimal gain, gain equalization, prevent damage to fiber and eye safety features.

Figure 2:
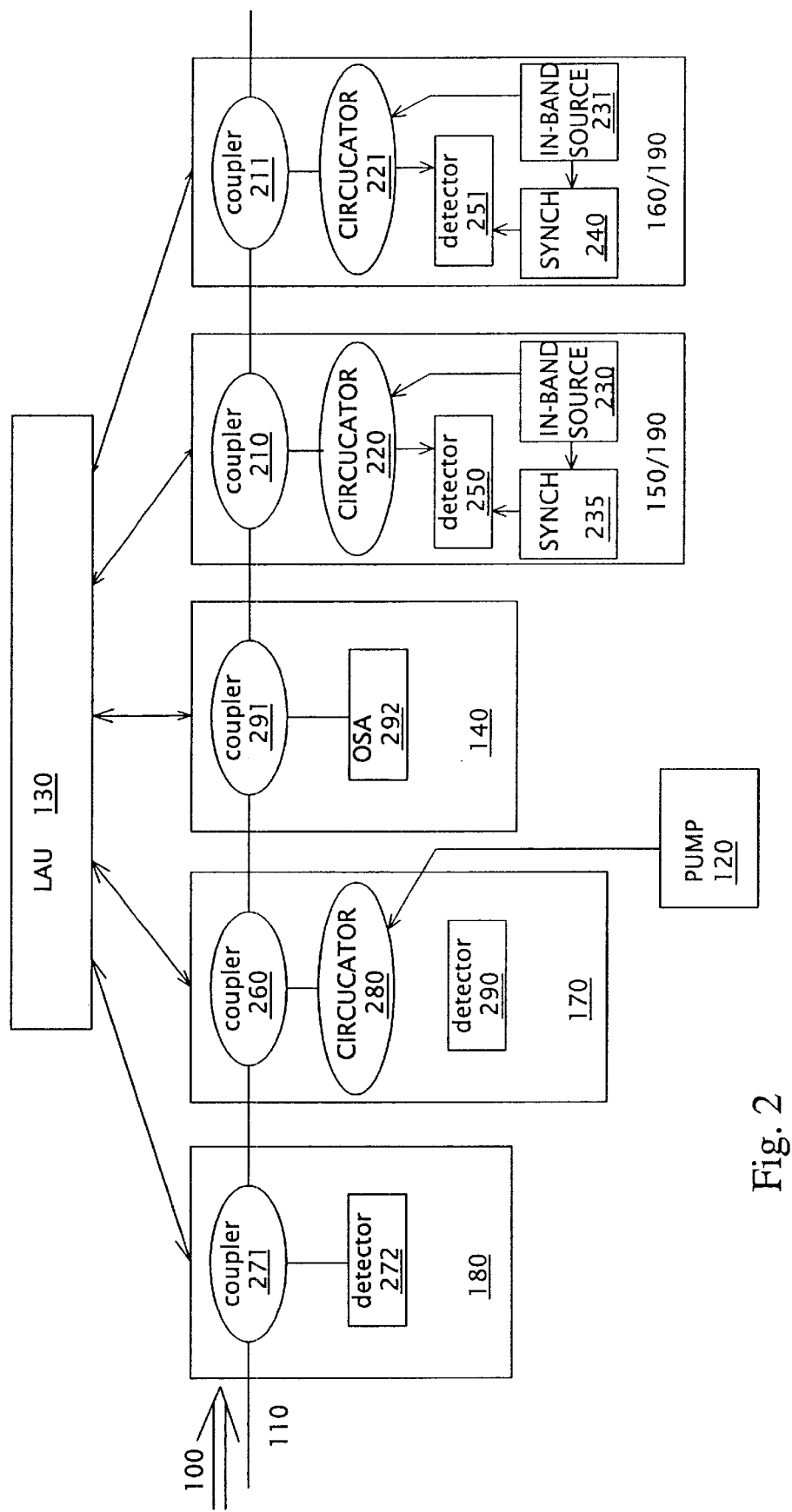
FIG. 2: Diagram of the Line Analyzing Unit showing its relationship with the transmission line and the hardware.

The measurement system is described in greater detail in FIG. 2. The amplification of signal 100 is performed along optical fiber transmission line 110 by non-linear Raman processes with high power Raman pump 120.

Unit 180 performs measurements of light reaching the coupler. These measurements monitor data signals 100 to be processed by LAU 130. Data signals power drop will initiate a pump 120 shut down. This unit includes an input coupler 271 and a detector 272. Input coupler 271 couples a fraction of incoming signals 100 and/or of the backscaterred Stimulated Raman scattered light, and detector 272 detects these signals and/or the scattered light.

Unit 170 performs measurements of the back reflected light of pump unit 120. These measurements monitor the back reflected light of pump unit 120, to be processed by LAU 130. A sudden increase in the back reflection light may indicate a line break or opening of a connector along the line, and will initiate a pump 120 shut down. This unit includes a WDM coupler 260 a circulator 280 a detector 290 and pump unit 120. The pump light of the pump unit 120 is passed through circulator 280 and WDM coupler 260 to line 110. Back reflected signals are passed through WDM coupler 260 and circulator 280 to detector 290.

Unit 140 performs optical spectrum analysis on any combination of the following signals reaching tap coupler 291: data signals 100, pump unit 120 back reflections, backscattered Stimulated Raman scattering, and sends the measured spectrum to LAU 130. The power deviation between the data channels of signals 100 is used to adjust pump unit 120 to set the desired gain and gain equalization. A sudden increase in the back reflection light may indicate a line break or opening of a connector along the line, and will initiate a pump shut down, as in 170. The ratio of the backscattering Stimulated Raman scattering measured by optical spectrum analyzer (OSA) 292 using more than one pump 120 power level is a characteristic of the fiber type. This ratio is fed into LAU 130, from which the fiber type 110 is identified. This information is used to set pump unit 120 to achieve desired gain and gain equalization. This unit includes a tap coupler 291 and an optical spectrum analyzer 292. Input coupler 291 couples a fraction of incoming signals 100 and/or of the backscattered light from pump 120 and/or of the backscattered Stimulated Raman scattered light.

The functionality of 150 and/or 190 unit is as follows. The functionality of 150 is the measurement of the backscattered light from continuous wave source and/or from repetitive pulsed source, optionally time gated at the receiver, in the Raman gain band. From these measurements performed at least at one pump 120 power level, the ratio between the Raman gain coefficient g0 and the fiber effective area—g0/Aeff could be calculated. This ratio characterizes different fiber types. The functionality of 150 is also to measure the fiber loss, fiber length, distance to connectors and splices, and the losses of splices and connectors at wavelengths within the Raman gain band. The functionality of 150 is also to measure the backscattered Stimulated Raman scattering using pump 120 at least at one power level, when light source 230 is off. The ratio between the backscattered Stimulated Raman scattering measurements at more than one pump 120 power levels may indicate the type of fiber 110. The functionality of 190 is the measurement of the dispersion of the fiber. The dispersion characterizes different fiber types. This information is used to set pump unit 120 to achieve desired gain and gain equalization. This unit includes a WDM coupler 210 for signals within the Raman gain band, a circulator 220, a light source comprising of at least one laser diode 230, a detector 250, and synchronizing electronics 235. Light source 230 generates a continuous wave and/or repetitive pulses at least at one wavelength, which are coupled into line 110 through circulator 220 and WDM coupler 210. Returned signals within the WDM coupler 210 pass-band are passed through circulator 220 into detector 250. Detector 250 is synchronized with the generation of repetitive pulses of laser diode source 230, so that the time of flight of the pulses could be measured, from which the dispersion characteristics of the fiber can be calculated.

The functionality of 160 and/or 190 unit is as follows. The functionality of 160 is the measurement of the backscattered light from continuous wave source and/or from repetitive pulsed source, optionally time gated at the receiver, outside of the Raman gain band. The functionality of 160 is to provide the fiber loss as well as fiber length, distance to connectors and splices, and the losses of splices and connectors at wavelengths out of the Raman gain band. The functionality of 190 is the measurement of the dispersion of the fiber. The dispersion characterizes different fiber types. This information is used to set pump unit 120 to achieve desired gain and gain equalization. This unit includes a WDM coupler 211 for signals which are out of the Raman gain band, a circulator 221, a light source comprising of at least one laser diode 231, a detector 251, and synchronizing electronics 240. Light source 231 generates a continuous wave and/or repetitive pulses at least at one wavelength, which are coupled into line 110 through circulator 221, and WDM coupler 211. Returned signals within the WDM coupler 211 pass-band are passed through circulator 221 into detector 251. Detector 251 is synchronized with the generation of repetitive pulses of laser diode source 231, so that the time of flight of the pulses could be measured, from which the dispersion characteristics of the fiber could be calculated. From data collected by LAU 130 from units 140, 150, 160, 170, 180 and 190, it is possible to analyze the fiber type characteristics. Thus, the information provided by the measurement described above is used to analyze the optical transmission line, determine the fiber type or types calculate and optimize the Raman gain and gain equalization. For example, if the fiber is of one type which has been characterized or identified, then the pump power at distance z from the pump, Ppump(z), can be calculated, in the non-depletion pump approximation in the case of a single pump, according to:

$$Ppump(z) = Ppump(0) exp(-\alpha_{pump} z) \quad (4)$$

where Ppump(0) is the launched pump power and $\alpha_{pump}$ is the measured fiber loss for the pump. The total Raman gain G can be calculated in a backward pumping configuration, in the non-depletion pump approximation in the case of a single pump, according to:

$$G = exp(g0 \; Ppump \; Leff/(Aeff \; K)) \quad (5)$$

where g0 is the Raman gain coefficient, which depends on the fiber type, Ppump is the pump power, Aeff is the effective area of the fiber, K is a numerical factor that accounts for polarization mismatch between the pump and the signal, and Leff is the effective length of the fiber calculated according to:

$$Leff = (1 - exp(-\alpha_{pump} L))/\alpha_{pump} \quad (6)$$

with L the total fiber length and $\alpha_{pump}$ is the measured fiber loss for the pump. This method of analysis is a part of the preferred embodiment. In other implementations, other methods of analysis may be employed.

Figure 3:
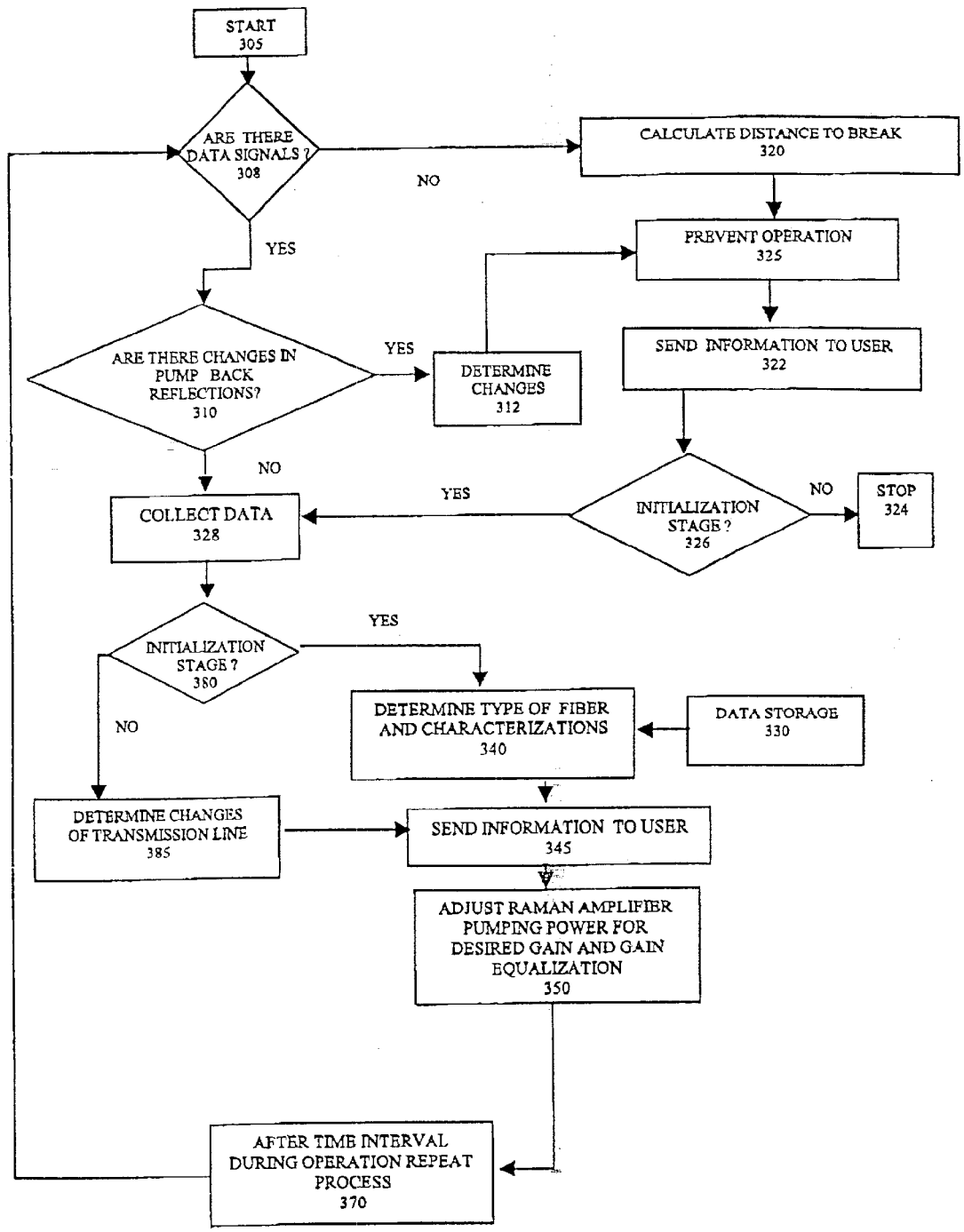
FIG. 3. Diagram of the optical transmission line analysis process performed by the Line Analyzing Unit showing control of the Raman pumping unit.
Figure 1B:
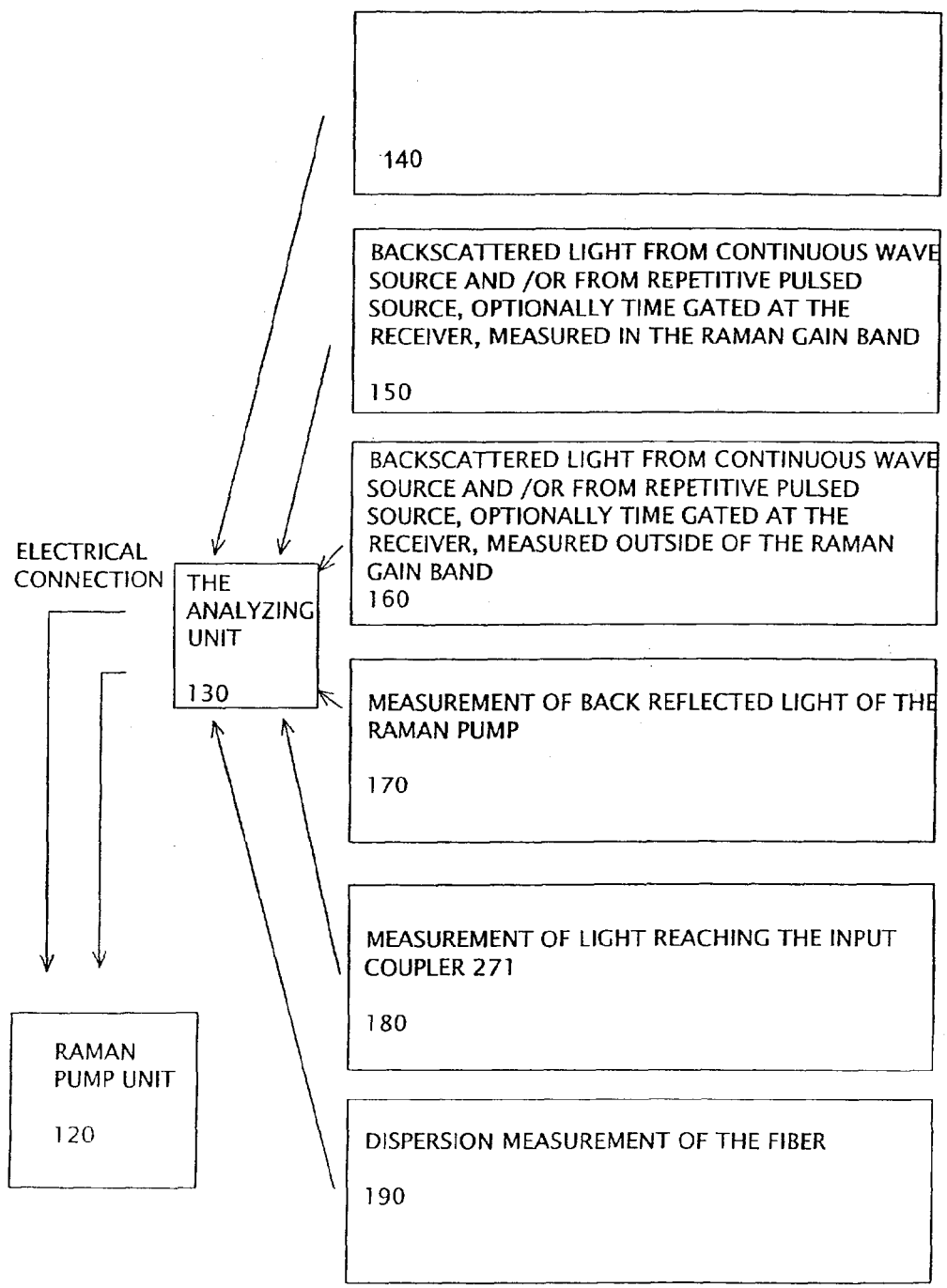
Figure 2:
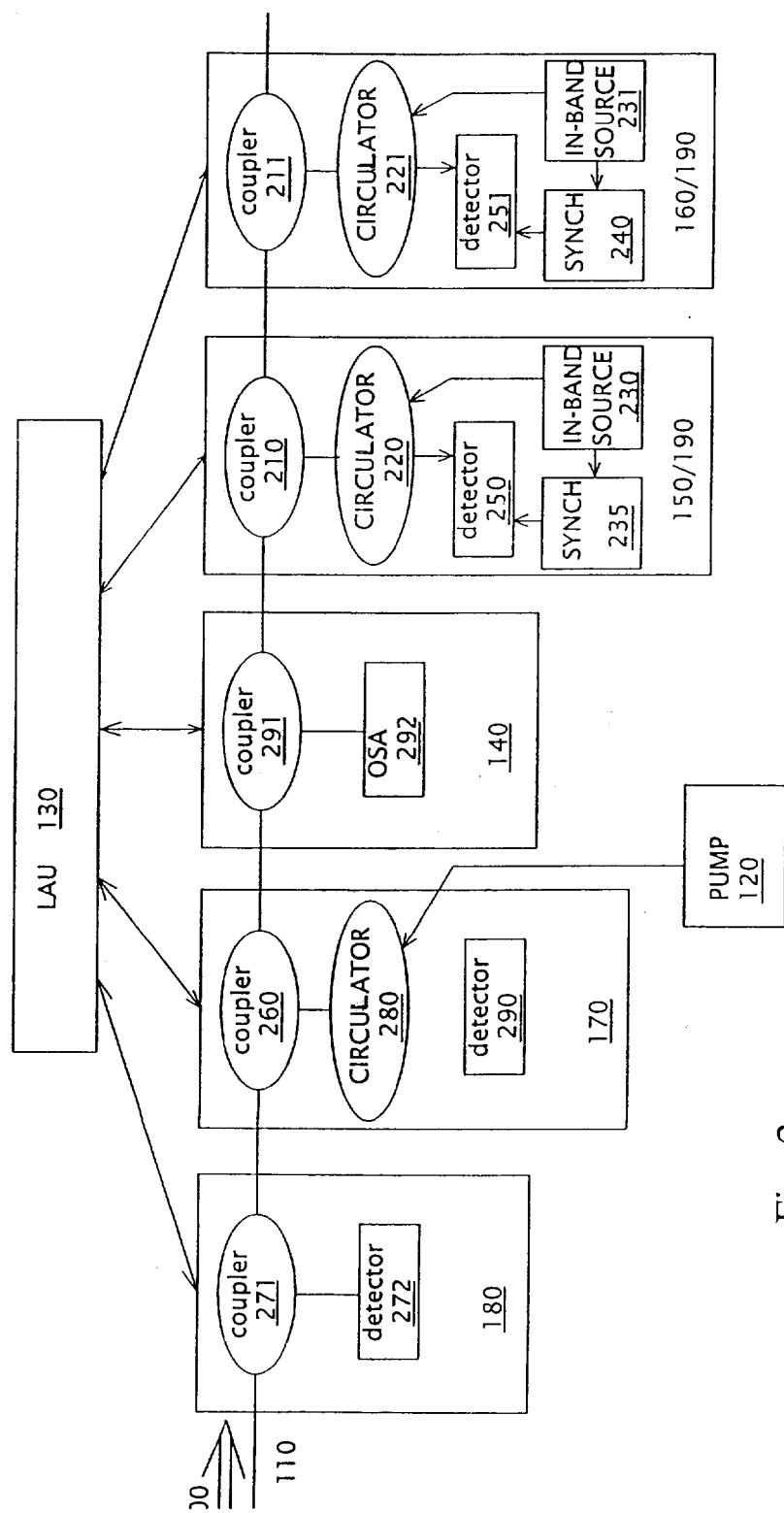

The operation of the LAU of the self adjusting Raman amplifier is shown in FIG. 3, starting at 305. At the first step 308, the processor determines whether there are data signals. If no data signals have been detected, indicating a break along the line or no data transmission, then the process proceeds to step 320 where an attempt to measure or estimate the distance to break or fault is performed. Pump 120 is prevented from operating at step 325, and this information is provided to the user to facilitate inspection and repair at step 322, if a break has been detected. The process proceeds from step 322 to step 326, and the process terminates at step 324 if step 326 was reached at the initialization stage. If step 326 was reached not during the initialization stage, the process proceeds from step 326 to step 328. If data signals are present, the process proceeds from step 308 to step 310 where the question is whether there are changes in pump 120 back reflections. If there are changes in the pump 120 back reflections, indicating a connector opening along the line, the changes are determined at 312, and the process proceeds to step 325. If there are no changes in the pump 120 back reflection, the process proceeds from step 310, where information on the backscattered and reflected light is collected at 328. During initialization stage, the process proceeds from step 380 to step 340, where stored information on various optical fibers is provided to LAU processor 131 at step 330. By comparison of the measurements to this database, and by analyzing the measured data, LAU processor 131 determines the fiber type and characteristics at step 340 where the results are sent to the user at step 345. In the case the process is performed after the initialization stage, the process proceeds from step 380 to step 385 where changes to the transmission line are determined, and the information is send to the user at step 345. The process then proceeds to step 350 where the Raman amplifier pump 120 power is adjusted to produce the optimal gain and gain equalization. The process proceeds from step 350 to step 370. At step 370 the entire process of steps 308 through 370 is repeated as many times as desired during the course of the day to account for changes in the line. Such changes may include optical line switching by optical switches or slow degradation due to aging processes and temperature changes.

The invention described here significantly improves upon the prior art by providing an optical fiber transmission line diagnostic mechanism, coupled to a Raman pump unit, in order to calculate adjust and optimize the operating parameters of the Raman amplifier. This diagnostic mechanism can also prevent initiation of Raman amplification when breaks or cracks are present in the transmission line that would prove destructive because of electric arcing. The invention has the capability to continuously monitor the optical fiber transmission line by performing tests during the operation of the Raman amplifier. It is readily apparent that the embodiments described above represent a significant advance in the fiber optic telecommunication arts.

The telecommunications systems described above are for purposes of example only. An embodiment of the invention may be implemented in any type of fiber optic telecommunications system environment. Thus, a method and apparatus for a self adjusting Raman amplifier for fiber optic transmission lines is described in conjunction with one or more specific embodiments. The invention is defined by the claims and their full scope of equivalents.

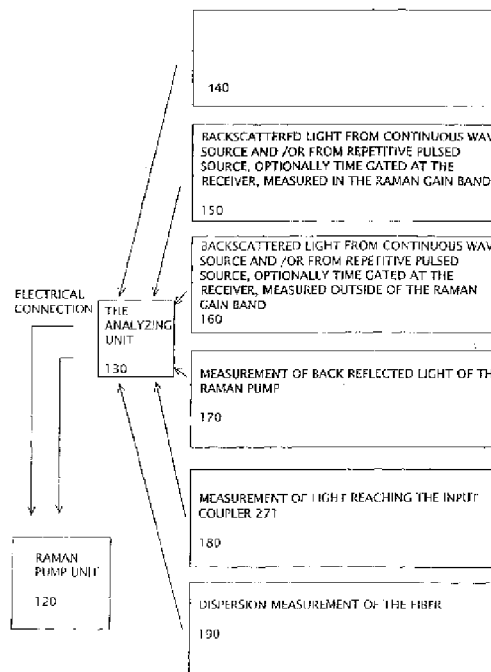

What is claimed is:

1. A method of operating an optical fiber transmission line wherethrough signals are transmitted in a signal wavelength band, comprising the steps of:
   (a) pumping the transmission line, using at least one optical pump, thereby effecting Raman amplification of the signals;
   (b) determining at least one characteristic of the optical fiber transmission line, said at least one characteristic selected from the group consisting of types of fiber sections in the transmission line, lengths of said fiber sections, Raman gain coefficients of said fiber sections, and effective areas of said fiber sections,
   (c) adjusting a power of said at least one optical pump in accordance with said at least one characteristic.

2. The method of claim 1, wherein said determining and said adjusting are effected prior to said pumping.

3. The method of claim 1, wherein said determining and said adjusting are effected during said pumping.

4. The method of claim 1, wherein said pumping is effected in a pump wavelength band, and wherein determining said at least one characteristic further includes determining at least one characteristic selected from the group consisting of an optical propagation loss in the signal wavelength band and an optical propagation loss in said pump wavelength band.

5. The method of claim 1, wherein said at least one characteristic further includes a ratio of said Raman gain coefficient to said fiber effective area.

6. The method of claim 5, wherein said determining of said ratio is effected by steps including measuring a Raman on-off gain of the transmission line.

7. The method of claim 6, wherein said measuring is effected using a pulsed signal synchronized with a pulsed light source.

8. The method of claim 6, wherein said measuring is effected using a continuous wave signal.

9. The method of claim 7, wherein said measuring is effected at at least two power levels of said at least one optical pump.

10. The method of claim 1, wherein said at least one characteristic further includes a ratio of backscattered Raman Amplified Spontaneous Emission (Raman ASE) at at least two powers of said at least one optical pump.

11. The method of claim 1, wherein said determining of said at least one characteristic includes the step of:
    (i) measuring at least one material property of the transmission line.

12. The method of claim 11, wherein said at least one material property is selected from the group consisting of on-off Raman gain, backscattered Raman Amplified Spontaneous Emission (Raman ASE), and fiber dispersion.

13. The method of claim 11, wherein said determining of said at least one characteristic further includes the steps of:
    (ii) providing a data set that includes a plurality of fiber types and respective values of said at least one material property; and
    (iii) correlating said measurement of said at least one material property with said data set to determine at least one said fiber types of the transmission line.

14. The method of claim 11, wherein said at least one material property is selected from the group consisting of a ratio of a Raman gain coefficient to a fiber effective area and a ratio of backscattered Raman Amplified Spontaneous Emission (Raman ASE) at at least two power levels of said at least one optical pump.

15. The method of claim 1, wherein said determining is effected by detecting a backreflection of said pumping.

16. The method of claim 13, wherein said adjusting includes disabling said at least one optical pump.

17. The method of claim 1, wherein said determining is effected by detecting a loss of power of the signals.

18. A system for optimizing the performance of an optical transmission line, comprising:
    (a) at least one optical pump for pumping the transmission line to amplify signals that are transmitted therethrough by Raman amplification;
    (b) at least one monitoring system for determining at least one characteristic of the transmission line, said at least one monitoring system including
       (i) an internal light source; and
       (ii) a mechanism for coupling light from said light source into the transmission line; and
    (c) a line analyzing unit for adjusting a power of said at least one optical pump in accordance with said at least one characteristic.

19. The system of claim 18, wherein said at least one monitoring system for determining at least one characteristic of the transmission line further includes
    (iii) a light detector, and
    (iv) a mechanism for diverting light from the transmission line to said detector.

20. The system of claim 18, wherein said light from said internal light source is in a Raman gain band of the transmission line, relative to said at least one optical pump.

21. The amplifier of claim 18, wherein said light from said internal light source is outside of a Raman gain band of the transmission line, relative to said at least one optical pump.

22. The system of claim 18, wherein said light source is continuous.

23. The system of claim 18, wherein said light source is pulsed.

24. The system of claim 23, wherein said light detector is synchronized with said pulsed light source.

25. The system of claim 18, wherein said mechanism for coupling light includes:
    (a) a circulator that is optically coupled to said detector and to said light source; and
    (b) a coupler that is optically coupled to said circulator and to the transmission line.

26. The system of claim 18, wherein said mechanism for diverting light includes:
    (a) a circulator that is optically coupled to said detector and to said at least one optical pump; and
    (b) a coupler that is optically coupled to said circulator and to the transmission line.

27. A method of operating an optical fiber transmission line wherethrough signals are transmitted in a signal wavelength band, comprising the steps of:

(a) pumping the transmission line, using at least one optical pump, thereby effecting Raman amplification of the signals;

(b) determining at least one characteristic of the optical fiber transmission line, said at least one characteristic selected from the group consisting of connector quality along the transmission line, splice quality along the transmission line and maximal allowed launched pump power, and (c) adjusting a power of said at least one optical pump in accordance with said at least one characteristic.

* * * * *

UNITED STATES PATENT AND TRADEMARK OFFICE
CERTIFICATE OF CORRECTION

PATENT NO.   : 6,433,922 B1
DATED        : August 13, 2002
INVENTOR(S)  : Ghera et al.

It is certified that error appears in the above-identified patent and that said Letters Patent is hereby corrected as shown below:

The title page, showing the illustrative figure should be deleted, and substituted therefore the new title page with the illustrated figure attached The drawing sheets consisting of figures 1B and 2 should be deleted, to be replaced with the drawing sheets consisting of figures 1B and 2, as shown on the attached sheets.

Signed and Sealed this

Sixth Day of May, 2003

JAMES E. ROGAN
*Director of the United States Patent and Trademark Office*

(12) United States Patent
Ghera et al.

(10) Patent No.: US 6,433,922 B1
(45) Date of Patent: Aug. 13, 2002

(54) APPARATUS AND METHOD FOR A SELF ADJUSTING RAMAN AMPLIFIER

(75) Inventors: Uri Ghera, Tel Aviv; Doron Meshulach, Ramat Gan; Ophir Eyal, Ramat Hasharon, all of (IL)

(73) Assignee: REDC Optical Networks Ltd., Tel Aviv (IL)

(*) Notice: Subject to any disclaimer, the term of this patent is extended or adjusted under 35 U.S.C. 154(b) by 0 days.

(21) Appl. No.: 09/791,685

(22) Filed: Feb. 26, 2001

(51) Int. Cl.⁷ .................................................. H01S 3/00
(52) U.S. Cl. ................................................. 359/334; 359/337
(58) Field of Search .................................. 359/334, 337, 359/341.4

(56) References Cited

U.S. PATENT DOCUMENTS

| | | |
|---|---|---|
| 4,401,362 A | 8/1983 | Mochizuki |
| 4,616,898 A | 10/1986 | Hicks |
| 4,699,452 A | 10/1987 | Mollenauer |
| 5,298,965 A | 3/1994 | Spirit et al. |
| 5,448,579 A | 9/1995 | Blank et al. |
| 5,623,508 A | 4/1997 | Grubb et al. |
| 5,673,280 A | 9/1997 | Grubb et al. |
| 5,966,206 A | 10/1999 | Jander |
| 6,038,356 A | 3/2000 | Kerfoot et al. |
| 6,052,219 A | 4/2000 | Kidorf et al. |
| 6,081,366 A | 6/2000 | Kidorf |
| 6,184,464 B1 | 1/2001 | Kidorf et al. |
| 6,292,288 B1 * | 9/2001 | Akasaka et al. .......... 359/334 |

FOREIGN PATENT DOCUMENTS

JP WO00/05622 2/1900

OTHER PUBLICATIONS

"Optical Time Domain Reflectometry on Optical Amplifier Systems", Blank et al. Journal of Lightwave Technology vol. 7, No. Oct. 1989 pp. 1549–1555.
"Raman–Assisted Long Distance Optical Time Domain Reflectometry" Electronics Letters, Dec. 89 vol. 25 No. 25 p. 1687–9 Spirit et al.

(List continued on next page.)

Primary Examiner—Mark Hellner
(74) Attorney, Agent, or Firm—Mark M. Friedman

(57) ABSTRACT

This invention describes an apparatus and method for a self adjusting Raman amplifier for fiber optic transmission lines incorporating a line diagnostic mechanism in order to calculate, control and optimize the operating parameters for the amplifier. This need arises because the amplifier gain medium is the transmission line itself and the amplifier properties depend on the optical fiber properties along the first tens of kilometers of the transmission line from the pump. A Line Analyzing Unit, adjacent to the Raman pump unit, operates before the Raman pump is enabled and during operation, and characterizes the transmission line. The Line Analyzing Unit determines and characterizes the types of optical fibers installed along the transmission line and calculates and optimizes the pump or pumps power in order to achieve optimum gain and gain equalization. The Line Analyzing Unit may also determine if there is an optical loss or reflection in the optical fiber that can be destructive when the high power Raman pump is operating.

27 Claims, 5 Drawing Sheets